(12) United States Patent
Takeda et al.

(10) Patent No.: US 12,137,360 B2
(45) Date of Patent: Nov. 5, 2024

(54) TERMINAL, RADIO COMMUNICATION METHOD, BASE STATION, AND SYSTEM

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/930,350

(22) Filed: Sep. 7, 2022

(65) Prior Publication Data

US 2023/0007512 A1    Jan. 5, 2023

Related U.S. Application Data

(63) Continuation of application No. 16/970,795, filed as application No. PCT/JP2018/005802 on Feb. 19, 2018, now abandoned.

(51) Int. Cl.
*H04W 24/04* (2009.01)
*H04W 72/23* (2023.01)

(52) U.S. Cl.
CPC ........... *H04W 24/04* (2013.01); *H04W 72/23* (2023.01)

(58) Field of Classification Search
CPC ..... H04B 7/0695; H04B 7/088; H04L 5/0053; H04W 24/04; H04W 24/08; H04W 48/12; H04W 72/042; H04W 72/23
See application file for complete search history.

(56) References Cited

U.S. PATENT DOCUMENTS

| | | | |
|---|---|---|---|
| 10,432,441 B2 * | 10/2019 | Papasakellariou | .... H04L 5/0048 |
| 10,931,514 B2 * | 2/2021 | Xia | ........................ H04L 5/0023 |
| 11,082,286 B2 * | 8/2021 | Pan | ........................ H04B 7/088 |

(Continued)

FOREIGN PATENT DOCUMENTS

| | | | | |
|---|---|---|---|---|
| AU | 2018216588 A1 * | 8/2019 | ........... | H04B 7/0456 |
| CA | 3052762 A1 * | 8/2018 | ........... | H04B 7/0456 |

(Continued)

OTHER PUBLICATIONS

International Search Report issued in PCT/JP2018/005802 mailed on May 22, 2018 (1 page).

(Continued)

*Primary Examiner* — Eric Nowlin
(74) *Attorney, Agent, or Firm* — Osha Bergman Watanabe & Burton LLP

(57) ABSTRACT

A terminal is disclosed including a processor that when a search space for a beam failure recovery (BFR) procedure associated with a control resource set (CORESET) for the BFR procedure is configured by a radio resource control (RRC) information element, performs to monitor downlink control channel during the BFR procedure in the search space for the BFR procedure configured by the RRC information element, and when the search space is not configured by the RRC information element, performs to monitor the downlink control channel during the BFR procedure in a common search space; and a receiver that monitors the downlink control channel during the BFR procedure. In other aspects a radio communication method, a base station, and a system are also disclosed.

4 Claims, 9 Drawing Sheets

(56) References Cited

U.S. PATENT DOCUMENTS

| | | | |
|---|---|---|---|
| 11,101,967 B2* | 8/2021 | Sun | H04L 5/0007 |
| 11,109,247 B2 | 8/2021 | Chen | |
| 2018/0192405 A1* | 7/2018 | Gong | H04L 1/0045 |
| 2018/0227156 A1* | 8/2018 | Papasakellariou | H04L 5/0053 |
| 2018/0287860 A1* | 10/2018 | Xia | H04L 5/0023 |
| 2018/0288756 A1* | 10/2018 | Xia | H04W 72/0453 |
| 2019/0349915 A1* | 11/2019 | Ahn | H04L 5/0048 |
| 2019/0387470 A1 | 12/2019 | Nam et al. | |
| 2020/0059398 A1* | 2/2020 | Pan | H04B 7/0695 |
| 2020/0187236 A1* | 6/2020 | Moon | H04L 5/0044 |
| 2020/0274682 A1* | 8/2020 | Sun | H04L 5/0007 |
| 2020/0344835 A1 | 10/2020 | Wang et al. | |
| 2021/0084507 A1 | 3/2021 | Takeda et al. | |

FOREIGN PATENT DOCUMENTS

| | | | | |
|---|---|---|---|---|
| CN | 110035502 A | | 7/2019 | |
| CN | 110352578 A | * | 10/2019 | H04B 7/0456 |
| CN | 110035502 B | | 6/2021 | |
| CN | 113439452 A | * | 9/2021 | H04J 11/0073 |
| CN | 110352578 B | * | 5/2022 | H04B 7/0456 |
| CN | 115276735 A | * | 11/2022 | H04B 7/0456 |
| EP | 3528399 B1 | | 11/2020 | |
| EP | 4080811 A1 | * | 10/2022 | H04B 7/0456 |
| JP | 2020509662 A | * | 3/2022 | |
| JP | 7146781 B2 | * | 10/2022 | H04B 7/0456 |
| KR | 20210127934 A | * | 10/2021 | |
| WO | WO-2018053009 A1 | * | 3/2018 | |
| WO | WO-2018143784 A1 | * | 8/2018 | H04B 7/0456 |
| WO | 2019134506 A1 | | 7/2019 | |
| WO | 2019137378 A1 | | 7/2019 | |
| WO | WO-2019138531 A1 | * | 7/2019 | H04B 7/0695 |
| WO | 2019159370 A1 | | 8/2019 | |
| WO | WO-2020172264 A1 | * | 8/2020 | H04J 11/0073 |

OTHER PUBLICATIONS

Written Opinion of the International Searching Authority issued in PCT/JP2018/005802 mailed on May 22, 2018 (3 pages).
Samsung; "Issues on Beam failure recovery"; 3GPP TSG RAN WG1 Meeting AH 1801, R1-1800434; Vancouver, Canada; Jan. 22-26, 2018 (19 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 8)"; Mar. 2010 (149 pages).
3GPP TSG RAN WG1 Meeting AH1801; R1-1800160 "Clarifications on Beam Failure Recovery" MediaTek Inc.; Vancouver, CA; Jan. 22-26, 2018 (4 pages).
3GPP TSG RAN WG1 Meeting AH 1801; R1-1800661 "Remaining issues on beam recovery" NTT Docomo; Vancouver, Canada; Jan. 22-26, 2018 (5 pages).
3GPP TSG RAN WG1 Meeting #92; R1-1802472 "Remaining issues on beam recovery" NTT Docomo; Athens, Greece; Feb. 26-Mar. 2, 2018 (5 pages).
Extended European Search Report issued in European Application No. 18906533.7, dated Aug. 18, 2021 (7 pages).
3GPP TS 38.321 V15.0.0; 3GPP Technical Specification 38.321 Technical Specification Group Radio Access Network, NR, Medium Access Control (MAC) protocol specification (Release 15); Dec. 2017 (55 pages).
Huawei et al.; "CR to DRX on impacts of new RNTIs"; 3GPP TSG-RAN WG2 Ad Hoc, R2-1800638; Vancouver, Canada, Jan. 22-26, 2018 (4 pages).
Huawei et al.; "CR for Impacts of beam failure recovery on DRX"; 3GPP TSG-RAN WG2 Ad Hoc, R2-1800641; Vancouver, Canada, Jan. 22-26, 2018 ( 6 pages).
MediaTek [RAN1]; "LS to RAN2 on Beam Failure Recovery"; 3GPP TSG RAN WG1 Meeting #91, R1-1721346; Reno, USA, Nov. 27-Dec. 1, 2017 (3 pages).
RAN WG2; "LS to RAN 1 on beam recovery failure"; 3GPP TSG-RAN WG2 #100, R2-1714050; Reno, USA, Nov. 27-Dec. 1, 2017 (1 page).
Ericsson: "Contention based random access for beam failure recovery"; 3GPP TSG-RAN WG2 #AH NR 1801, R2-1800340; Vancouver, Canada, Jan. 22-26, 2018 (3 pages).
Sharp; "Remaining issues on beam failure recovery"; 3GPP TSG-RAN WG2 NR Ad hoc 0118, R2-1800560; Vancouver, Canada, Jan. 22-26, 2018 (13 pages).
Huawei et al.; "Remaining issue for beam failure recovery"; 3GPP TSG-RAN WG2 Ad Hoc, R2-1800632; Vancouver, Canada, Jan. 22-26, 2018 (4 pages).
Huawei et al.; "Impacts of new RNTIs on DRX"; 3GPP TSG-RAN WG2 Ad Hoc, R2-1800637; Vancouver, Canada, Jan. 22-26, 2018 (3 pages).
Huawei et al.; "Beam failure recovery impact on DRX"; 3GPP TSG-RAN2 NR Ad hoc 0118, R2-1800640; Vancouver, Canada, Jan. 22-26, 2018 (2 pages).
MediaTek Inc et al.; "RLM/RLF Considering Beam Failure Recovery"; 3GPP TSG-RAN WG2 #AH NR 1801, R2-1800646; Vancouver, Canada, Jan. 22-26, 2018 (6 pages).
Mediatek Inc.; "Draft CR for beam failure recovery procedure"; 3GPP TSG-RAN WG2 #AH NR 1801, R2-1800660; Vancouver, Canada, Jan. 22-26, 2018 (7 pages).
Extended European Search Report issued in European Application No. 23157535.8, mailed on Apr. 11, 2023 (8 pages).
Interdigital, Inc.: "Remaining issues on beam recovery"; 3GPP TSG RAN WG1 Meeting #90bis, R1-1718483, Prague, Czech Republic, Oct. 9-13, 2017 (5 pages).
Office Action issued in Indonesian Application No. P00202006781; Dated Nov. 29, 2022 (7 pages).
Office Action issued in European Application No. 18906533.7; Dated Dec. 21, 2022 (5 pages).
Office Action issued in counterpart Chinese Patent Application No. 201880089786.5 mailed on Aug. 14, 2023 (14 pages).
Office Action issued in Chinese Patent Application No. 201880089786.5 mailed on Jan. 25, 2024 (12 pages).

* cited by examiner

TERMINAL, RADIO COMMUNICATION METHOD, BASE STATION, AND SYSTEM

CROSS-REFERENCE TO RELATED APPLICATIONS

The present application is a continuation application and, thereby, claims benefit under 35 U.S.C. § 120 to U.S. patent application Ser. No. 16/970,795 filed on Aug. 18, 2020, titled, "USER TERMINAL AND RADIO COMMUNICATION METHOD," which is a national stage application of PCT Application No. PCT/JP2018/005802, filed on Feb. 19, 2018. The contents of these applications are incorporated by reference in their entirety.

TECHNICAL FIELD

The present disclosure relates to a terminal, a radio communication method, and a base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In the existing LTE systems (LTE Rel. 8 to Rel. 13), monitoring of radio link quality (radio link monitoring (RLM)) is performed. When a radio link failure (RLF) is detected in RLM, a user terminal (UE (User Equipment)) is requested to perform RRC (Radio Resource Control) connection re-establishment.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, performance of a procedure of detecting a beam failure and switching to another beam (which may be referred to as a beam recovery (BR) procedure and so on) is under study.

For NR, notification of downlink control information to the UE by using a control resource set (CORESET) being an allocation candidate region for a control channel is also under study. Certain search space configuration is associated with the CORESET.

During the beam recovery procedure, the use of the CORESET for a beam recovery procedure is under study. However, study as to what type of search space is to be used for the CORESET for a beam recovery procedure is not developed yet. Communication throughput, spectral efficiency, and so on may be deteriorated unless an appropriate search space is specified, because the beam recovery procedure cannot be successfully completed.

In view of this, the present disclosure has one object to provide a user terminal and a radio communication method that can preferably and successfully complete a beam recovery procedure.

Solution to Problem

A user terminal according to one aspect of the present disclosure includes: a receiving section that performs monitoring of a downlink control channel during a beam failure recovery (BFR) procedure; and a control section that identifies correspondence between a format of downlink control information transmitted on the downlink control channel and a search space in which the monitoring is performed.

Advantageous Effects of Invention

According to one aspect of the present disclosure, a beam recovery procedure can be preferably and successfully completed.

DESCRIPTION OF EMBODIMENTS

For NR, performing communication by using beam forming (BF) is under study. For example, a UE and/or a base station (for example, a gNB (gNodeB)) may use a beam used to transmit a signal (also referred to as a transmit beam, a Tx beam, and so on), and a beam used to receive a signal (also referred to as a receive beam, an Rx beam, and so on).

In the environment using BF, it is assumed that radio link quality is deteriorated because the radio link quality is liable to suffer the influence of interruption of an obstruction. Due to deterioration of the radio link quality, a radio link failure (RLF) may frequently occur. When RLF occurs, reconnection to a cell is required. Therefore, frequent occurrence of RLF causes deterioration of system throughput.

For NR, to reduce occurrence of RLF, the following is under study: when quality of a specific beam is deteriorated, a procedure of switching to another beam (which may be referred to as beam recovery (BR), beam failure recovery (BFR), L1/L2 (Layer 1/Layer 2) beam recovery, and so on) is performed. Note that the BFR procedure may be simply referred to as BFR.

Figure 1:
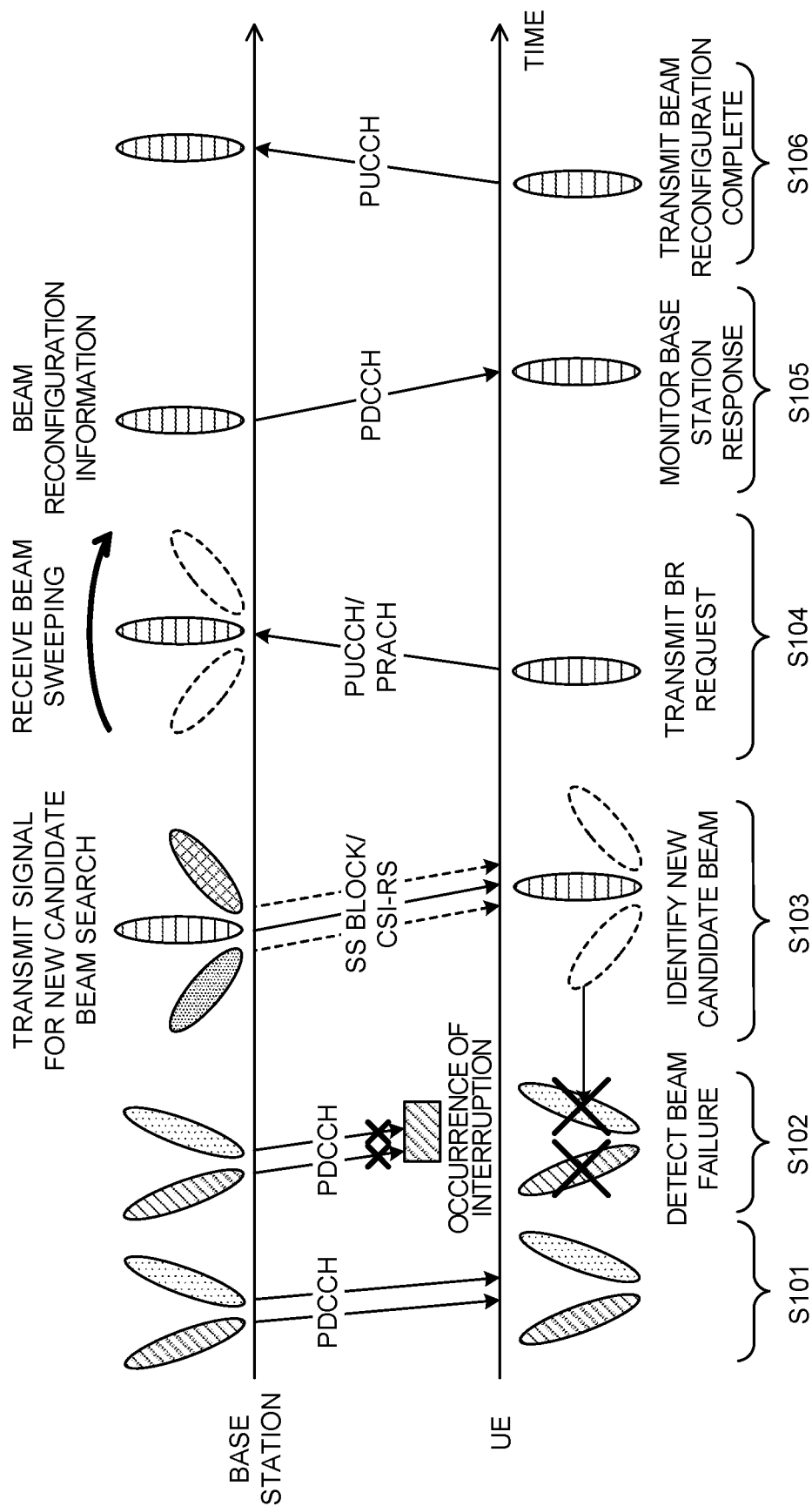
FIG. 1 is a diagram to show an example of a beam recovery procedure.

FIG. 1 is a diagram to show an example of a beam recovery procedure. The number of beams and so on are merely examples, and are not restrictive. In an initial state (Step S101) of FIG. 1, the UE receives a downlink control channel (PDCCH (Physical Downlink Control Channel)) transmitted by using two beams.

In Step S102, due to interruption of radio waves from the base station, the UE cannot detect the PDCCH. Such interruption may occur due to the influence of an obstruction between the UE and the base station, fading, interference, and so on, for example.

When certain conditions are satisfied, the UE detects a beam failure. When there is no notification from the UE, or when the base station receives a certain signal (beam recovery request in Step S104) from the UE, the base station may determine that the UE has detected the beam failure.

In Step S103, for the sake of beam recovery, the UE initiates search for a new candidate beam to be used for new communication. When the UE detects the beam failure, the UE may perform measurement based on preconfigured downlink signal (which may be referred to as DL-RS (Reference Signal) and so on) resources, and may identify one or more desirable new candidate beams (for example, one or more new candidate beams having excellent quality). In the case of the present example, one beam is identified as a new candidate beam.

The DL-RS resources may be associated with resources and/or ports for a synchronization signal block (SSB) or a channel state measurement RS (CSI-RS (Channel State Information RS)). Note that the SSB may be referred to as an SS/PBCH (Physical Broadcast Channel) block and so on.

The DL-RS may be at least one of a primary synchronization signal (PSS (Primary SS)), a secondary synchronization signal (SSS (Secondary SS)), a mobility reference signal (MRS (Mobility RS)), a signal included in an SSB, a CSI-RS, a demodulation reference signal (DMRS), a beam-specific signal, and so on, or may be a signal configured by extending and/or modifying the above signals (for example, a signal configured by modifying density and/or a period). The DL-RS may be referred to as a signal for new candidate beam detection.

In Step S104, the UE that has identified the new candidate beam transmits a beam recovery request (BFRQ (Beam Failure Recovery reQuest)). The beam recovery request may be referred to as a beam recovery request signal, a beam failure recovery request signal, and so on.

For example, the beam recovery request may be transmitted by using at least one of an uplink control channel (PUCCH (Physical Uplink Control Channel)), a random access channel (PRACH (Physical Random Access Channel)), and a UL grant free PUSCH (Physical Uplink Shared Channel).

The beam recovery request may include information of the new candidate beam identified in Step S103. Resources for the beam recovery request may be associated with the new candidate beam. Information of the beam may be notified by using a beam index (BI), a port for a certain reference signal, a resource index (for example, a CSI-RS resource indicator (CRI)), and/or the like.

In Step S105, the base station that has detected the beam recovery request transmits a response signal for the beam recovery request from the UE. The response signal may include reconfiguration information (for example, configuration information of DL-RS resources) related to one or a plurality of beams. For example, the response signal may be transmitted in a UE-common search space for a PDCCH. The UE may determine a transmit beam and/or a receive beam to be used, based on the beam reconfiguration information.

In Step S106, the UE may transmit a message to the base station, indicating that beam reconfiguration has been completed. For example, the message may be transmitted on a PUCCH, or may be transmitted on a PUSCH.

Beam recovery success (BR success) may represent a case where the processing has reached Step S106, for example. On the other hand, beam recovery failure (BR failure) may represent a case where no candidate beam can be identified in Step S103, for example.

Note that the numbers of the above steps are merely numbers assigned for the sake of description. A plurality of steps may be combined together, or the order may be rearranged. Whether or not BFR is performed may be configured for the UE by using higher layer signaling.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CEs), MAC PDUs (Protocol Data Units), and the like. For example, the broadcast information may be master information blocks (MIBs), system information blocks (SIBs), minimum system information (RMSI (Remaining Minimum System Information)), other system information (OSI), and the like.

For NR, CB-BFR (Contention-Based BFR), which is BFR based on a contention-based random access (RA) procedure, and CF-BFR (Contention-Free BFR), which is BFR based on a contention-free random access procedure, are under study.

In CB-BFR, the UE may transmit a preamble selected from one or a plurality of preambles (each also referred to as an RA preamble, a random access channel (PRACH (Physical Random Access Channel)), a RACH preamble, and so on) at random. On the other hand, in CF-BFR, the UE may transmit a preamble that is allocated for the UE in a UE-specific manner by the base station. In CB-BFR, the base station may allocate the same preamble for a plurality of UEs. In CF-BFR, the base station may allocate a preamble individually for a UE.

In CB-BFR, when the base station receives a certain preamble as the beam recovery request, the base station may not be able to identify to which UE the preamble is transmitted. When contention resolution is performed at some point between the beam recovery request and the beam reconfiguration completion, the base station can identify an identifier (for example, a cell-radio RNTI (C-RNTI)) of the UE to which the preamble is transmitted.

It may be assumed that the signal (for example, a preamble) transmitted by the UE during the RA procedure is the beam recovery request.

In either case of CB-BFR or CF-BFR, information related to PRACH resources (RA preamble) may be notified by using higher layer signaling (RRC signaling and so on), for example. For example, the information may include information indicating correspondence between a detected DL-RS (beam) and PRACH resources, and different PRACH resources may be associated for each DL-RS.

Detection of a beam failure may be performed in a MAC layer. Regarding CB-BFR, when the UE receives a PDCCH corresponding to a C-RNTI related to the UE itself, it may be determined that contention resolution has succeeded.

RA parameters of CB-BFR and CF-BFR may be of the same parameter set. Different values may be configured for the RA parameters of CB-BFR and CF-BFR.

For example, a parameter (which may be referred to as "ResponseWindowSize-BFR") indicating a time length for monitoring of a gNB response within a CORESET for a beam failure recovery response after a BFRQ may be applied to only CF-BFR.

Incidentally, for NR, to transmit a physical layer control signal (for example, downlink control information (DCI)) from the base station to the UE, the use of a control resource set (CORESET) is under study.

The CORESET is an allocation candidate region for a control channel (for example, a PDCCH (Physical Downlink Control Channel)). The UE may receive configuration information of the CORESET (which may be referred to as CORESET configuration and coreset-Config) from the base station. The UE can detect a physical layer control signal by monitoring the CORESET configured for its own terminal.

For example, the CORESET configuration may be notified by using higher layer signaling, or may be represented by certain RRC information elements (which may be referred to as "ControlResourceSet").

The CORESET configuration mainly includes information of resource related configuration and RS related configuration of a PDCCH, and may include, for example, information related to at least one of the following:

CORESET identifier (CORESET ID);
Scramble ID of a demodulation reference signal (DMRS) for a PDCCH;
Time length (time duration) (for example, one, two, or three symbols);
Frequency-domain resource allocation;
Mapping (interleave or non-interleave) of control channel elements (CCEs) and resource element groups (REGs);
REG bundle size;
Shift amount index in a case of interleave;
Transmission configuration indication (TCI) state for a PDCCH; and
Activation/deactivation of a TCI field.

On the other hand, a search region and a search scheme for PDCCH candidates are defined as a search space (SS). The UE may receive configuration information of the search space (which may be referred to as search space configuration) from the base station.

For example, the search space configuration may be notified to the UE by using higher layer signaling (RRC signaling and so on), and may be represented by certain RRC information elements (which may be referred to as "SearchSpace").

The search space configuration mainly includes information of monitoring related configuration and decoding related configuration of a PDCCH, and may include, for example, information related to at least one of the following:
Search space identifier (search space ID);
CORESET ID associated with the above search space configuration;
Flag indicating whether a search space is a common search space (C-SS (Common SS)) or a UE-specific search space (UE-SS (UE-specific SS));
Number of PDCCH candidates for each aggregation level;
Monitoring period;
Monitoring offset; and
Monitoring pattern within a slot (for example, 14-bit bitmap).

The UE monitors the CORESET, based on the search space configuration. "To monitor a CORESET" as used in the description of the present disclosure may be interpreted as "to monitor a search space (PDCCH candidates) associated with a CORESET", "to monitor downlink control channels (for example, PDCCHs)", "blind decoding and/or detection of downlink control channels (for example, PDCCHs)", and so on.

The UE can determine correspondence between the CORESET and the search space, based on the CORESET ID included in the search space configuration. One CORESET may be associated with one or a plurality of search spaces.

Incidentally, performing monitoring of a response signal for the beam recovery request in Step S105 described with reference to FIG. 1 by using a CORESET for BFR is under study. The CORESET for BFR may be configured for the UE by using certain RRC information elements (IEs) (which may be referred to as "CORESET-BFR").

However, study as to what type of search space is to be used for the CORESET for BFR is not developed yet. Communication throughput, spectral efficiency, and so on may be deteriorated, unless an appropriate search space is specified.

In view of this, the inventors of the present invention come up with the idea of configuration of a preferable search space for a CORESET for BFR, and its associated operation.

Embodiments according to the present disclosure will be described in detail with reference to the drawings as follows. A radio communication method according to each embodiment may be employed independently or may be employed in combination.

(Radio Communication Method)

First Embodiment

In a first embodiment, when BFR is configured, a CORESET for BFR and a search space for BFR are configured for the UE by using higher layer signaling. The search space for BFR may be configured for the UE by using certain RRC information elements (which may be referred to as "SearchSpace-BFR").

During the period of BFR (from the occurrence of a beam failure to beam recovery success), the UE may monitor a PDCCH, based on configuration parameters of the CORESET for BFR (parameters configured by using the CORESET-BFR) and configuration parameters for the search space for BFR (parameters configured by using the SearchSpace-BFR).

The CORESET-BFR may include a CORESET identifier (CORESET ID). The CORESET ID (hereinafter also referred to as a "BFR-CORESET ID") may correspond to a CORESET ID included in any piece of CORESET configuration. Specifically, the UE may determine that the UE uses a piece of CORESET configuration corresponding to the BFR-CORESET ID as the CORESET for BFR.

The CORESET-BFR may include the above-described information of the resource related configuration and the RS related configuration for the PDCCH included in the CORESET configuration and so on. When a parameter included in the CORESET-BFR is configured overlapping a parameter included in the CORESET configuration corresponding to the BFR-CORESET ID, the parameter included in the CORESET-BFR may be preferentially used (in other words, a parameter may be used overriding another parameter).

The SearchSpace-BFR may include a search space identifier (search space ID). The search space ID (hereinafter also referred to as a "BFR-search space ID") may correspond to a search space ID included in any piece of search space configuration. Specifically, the UE may determine that the UE uses search space configuration corresponding to the BFR-search space ID as the search space for BFR.

The SearchSpace-BFR may include the above-described information of the monitoring related configuration and the decoding related configuration for the PDCCH included in the search space configuration and so on. When a parameter included in the SearchSpace-BFR is configured overlapping a parameter included in the search space configuration corresponding to the BFR-search space ID, the parameter included in the SearchSpace-BFR may be preferentially used (in other words, a parameter may be used overriding another parameter).

The BFR-CORESET ID may represent a CORESET ID included in the CORESET-BFR, and may more generally represent a CORESET ID of the CORESET for BFR. The BFR-search space ID may represent a CORESET ID included in the SearchSpace-BFR, and may more generally represent a search space ID of the search space for BFR.

The UE monitors the CORESET indicated by the CORESET-BFR, based on the search space configuration indicated by the SearchSpace-BFR. Note that, if the CORESET ID included in the search space configuration indicated by the SearchSpace-BFR is different from the BFR-CORESET ID, the UE may replace only the CORESET ID with the BFR-CORESET ID while the UE may directly use other parameters than the CORESET ID included in the search space configuration.

Note that, if the CORESET-BFR is not used, the SearchSpace-BFR may include the BFR-CORESET ID.

The CORESET-BFR, the SearchSpace-BFR, the CORESET configuration, or the search space configuration may include information of a DCI format (for example, DCI format 0_0, 0_1, 1_0, 1_1, 2_X, and so on) of a monitoring target. The UE may determine a DCI format to be monitored during BFR, based on the information.

When the CORESET-BFR is configured, and the SearchSpace-BFR is not explicitly configured using higher layer signaling, the UE may interpret that a certain search space, out of pieces of search space configuration associated with the CORESET of the CORESET ID indicated by the CORESET-BFR, is the SearchSpace-BFR.

For example, the following case is assumed: the CORESET-BFR indicates CORESET ID=0, and the search space configuration to be monitored in association with CORESET ID=0 indicates Search Space ID=0, 1, and 2 (in other words, the search space configuration indicating Search Space ID=0, 1, and 2 each includes CORESET ID=0). In this case, the UE may use any of Search Space ID=0, 1, and 2 associated with CORESET ID=0 as the SearchSpace-BFR, and may perform monitoring of the PDCCH at the time of the beam recovery procedure.

Rules of selecting a search space ID to be associated with the CORESET-BFR when the SearchSpace-BFR is not explicitly configured using higher layer signaling may be specified in a specification, or may be configured by using higher layer signaling and so on.

For example, the UE may identify configuration of a search space corresponding to the CORESET-BFR, out of pieces of search space configuration associated with the CORESET corresponding to the CORESET-BFR, based on at least one of the following rules:

Search space having the smallest ID (for example, a search space ID or a CORESET ID);
Search space having the largest ID;
Search space configured as a UE-SS;
Search space configured as a C-SS; and
Search space configured to monitor a specific DCI format (for example, DCI format 0_0, DCI format 0_1, and so on).

According to the first embodiment, a search space for BFR can be configured for the UE regarding a CORESET for BFR, and the UE can appropriately monitor a PDCCH during BFR.

Note that, in the second and third embodiments to be described below, during the RA procedure, the UE may monitor a PDCCH in the C-SS and/or the UE-SS, based on configuration parameters of the CORESET for BFR (parameters configured by using the CORESET-BFR) and configuration parameters for the search space for BFR (parameters configured by using the SearchSpace-BFR). During the RA procedure, the UE may monitor a PDCCH in the C-SS.

Second Embodiment

Figure 2:
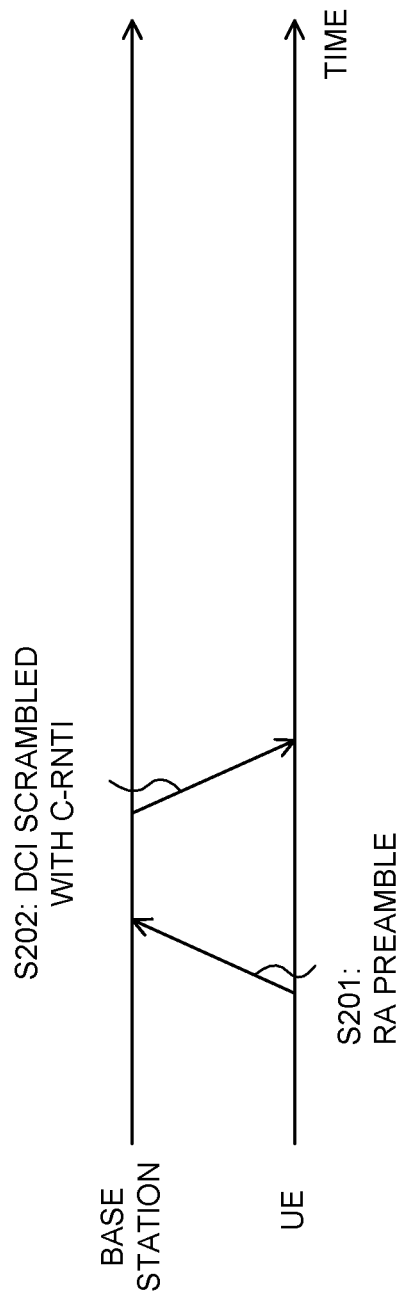
FIG. 2 is a diagram to show an example of a random access procedure of CF-BFR according to a second embodiment.

A second embodiment relates to CF-BFR. FIG. 2 is a diagram to show an example of a random access procedure of CF-BFR according to the second embodiment.

In the case of CF-BFR, the MAC layer of the UE may trigger preamble transmission for a physical layer (which may be referred to as a PHY layer, layer 1, and so on), based on certain conditions. The PHY layer may perform preamble transmission, in accordance with an indication of the MAC layer (Step S201).

For example, when a DL-RS as described above has received power (for example, RSRP (Reference Signal Received Power)) larger than a certain threshold, the UE may perform control to perform preamble transmission by using PRACH resources associated with the DL-RS (or a beam identified based on the DL-RS).

Information related to the certain conditions (for example, the above certain threshold and so on) may be configured for the UE by using higher layer signaling (RRC signaling, an SIB, and so on), for example.

The UE may receive information (PDCCH order) for triggering preamble transmission from the base station, and may perform control to perform preamble transmission, based on the information.

The UE may monitor a PDCCH with cyclic redundancy check (CRC) bits masked (scrambled) with a C-RNTI corresponding to the UE, in a certain period (which may be referred to as a monitoring window) (Step S202). When the UE successfully receives (decodes) the PDCCH, the UE may determine that BFR has successfully completed, and may consider that BFR has successfully completed.

Information related to the above certain period (time length and so on) may be configured for the UE by using higher layer signaling (RRC signaling, an SIB, and so on), for example. For example, the start of the above certain period may be the same as the start of BFR, may be the same as RA preamble transmission timing, or may be determined based on at least one of these.

The PDCCH to be monitored in the above certain period may include DCI for UL data channel (for example, a PUSCH) scheduling (the DCI may be referred to as a "UL grant" and so on). The PDCCH may include a CSI request field for requesting a CSI report from the UE.

The UE may monitor a UL grant in the above certain period, and based on a value of the CSI request field included in the UL grant, the UE may feed back certain CSI by using a PUSCH scheduled in the UL grant. In this case, CSI can be promptly reported after occurrence of a beam failure, and thus beam adjustment can be preferably controlled.

For example, the PDCCH may include DCI (for example, DCI format 0_1) transmitted in the UE-SS, and may include DCI (for example, DCI format 0_0) transmitted in the C-SS and/or the UE-SS. It is preferable that these pieces of DCI be transmitted in the UE-SS, since they are scrambled by using a C-RNTI and include a CSI request field.

Note that DCI format 0_1 may be interpreted by terms such as non-fallback DCI and non-fallback UL grant. For example, the non-fallback DCI may be DCI transmitted in the UE-SS, and may be DCI whose configuration (contents, a payload, and so on) is configurable by using UE-specific higher layer signaling (RRC signaling).

DCI format 0_0 may be interpreted by terms such as fallback DCI and fallback UL grant. The fallback DCI may be DCI transmitted in the C-SS, and may be DCI whose configuration is not configurable by using UE-specific higher layer signaling. Note that configuration (contents, a payload, and so on) of the fallback DCI may be configurable by using UE-common higher layer signaling (for example, broadcast information, system information, and so on) as well.

DCI format 0_1 includes a CSI request field. The size (the number of bits) of the CSI request field may be the same as the size of the CSI request field (which may be referred to as "ReportTriggerSize" and so on), which is configured for DCI format 0_1 used in UL data scheduling in a case except the beam recovery procedure, and which is configured by using higher layer signaling (for example, RRC signaling).

The size of the configured CSI request field may correspond to the size of the CSI request field for DCI format 0_1. For example, "ReportTriggerSize" may be any number of bits (1, 2, 3, 4, . . . ).

DCI format 0_0 may or may not include a CSI request field. Specifically, the CSI request field for DCI format 0_0 included in the above PDCCH in the second embodiment may be fixed to X bits, or may be fixed to 0 bits.

The UE may determine CSI configuration (CSI report) triggered by DCI format 0_0, based on correspondence between DCI format 0_0 and CSI configuration used for a report. The correspondence may be determined by a specification, or may be configured by using higher layer signaling (for example, RRC signaling).

For example, when the CSI request field for DCI format 0_0 is 0 or X bits, the UE may trigger one CSI report that is configured in association with DCI format 0_0 (or BFR).

When the CSI request field for DCI format 0_0 is X bits, the UE May trigger one CSI report indicated by the CSI request field, out of $2^X$ CSI reports that are configured in association with DCI format 0_0 (or BFR). For example, CSI request field=0 may correspond to a first configuration ID, CSI request field=1 may correspond to a second configuration ID, . . . , and CSI request field=$2^X$–1 may correspond to a Y-th configuration ID. The UE may trigger a CSI report corresponding to an indicated configuration ID.

Note that one or a plurality of fields, out of fields originally included in DCI format 0_0 (for example, a HARQ process number (HPN) field, a redundancy version (RV) field, a new data indicator (NDI) field, an MCS (Modulation and Coding Scheme) field, and so on), may be interpreted as the above CSI request field.

According to the second embodiment, CF-BFR can be appropriately performed by using a search space for BFR.

Third Embodiment

Figure 3:
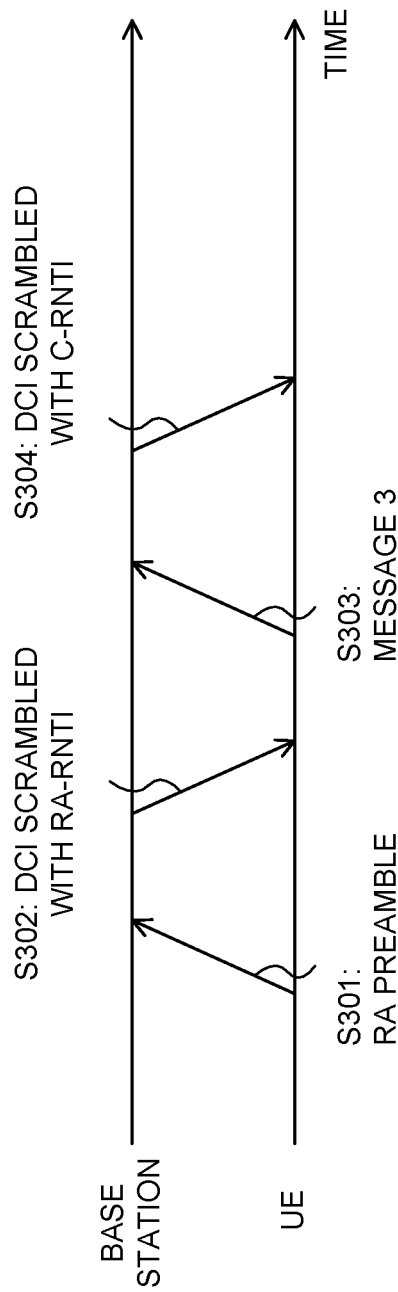
FIG. 3 is a diagram to show an example of a random access procedure of CB-BFR according to a third embodiment.

A third embodiment relates to CB-BFR. FIG. 3 is a diagram to show an example of a random access procedure of CB-BFR according to the third embodiment.

In the case of CB-BFR, the MAC layer of the UE may trigger preamble transmission for the PHY layer, based on certain conditions. The PHY layer may perform preamble transmission, in accordance with an indication of the MAC layer (Step S301).

For example, when a DL-RS as described above has received power (for example, RSRP) larger than a certain threshold, the UE may perform control to perform preamble transmission by using PRACH resources associated with the DL-RS.

Information related to the certain conditions (for example, the above certain threshold and so on) may be configured for the UE by using higher layer signaling (RRC signaling, an SIB, and so on), for example.

The UE may monitor a PDCCH with CRC bits masked (scrambled) with a random access RNTI (RA-RNTI), in a certain period (which may be referred to as a monitoring window) (Step S302). The RA-RNTI may be determined based on PRACH resources.

Information related to the above certain period (time length and so on) may be configured for the UE by using higher layer signaling (RRC signaling, an SIB, and so on), for example. For example, the start of the above certain period may be the same as the start of BFR, may be the same as RA preamble transmission timing, or may be determined based on at least one of these.

The PDCCH to be monitored in the above certain period may include DCI for DL data channel scheduling (the DCI may be referred to as a "DL assignment" and so on). For example, the DCI may include DCI (for example, DCI format 1_0) transmitted in the C-SS. The DCI may be used for scheduling a PDSCH of message 2 in the RA procedure.

The PDSCH of message 2 may include MAC CEs for a RA response, and the MAC CEs may further include a UL grant for scheduling a PUSCH of message 3 (hereinafter also referred to as a message 3 grant). The UE transmits the PUSCH of message 3, based on the message 3 grant (for example, by using resources indicated by the grant) (Step S303).

The message 3 grant may or may not include a CSI request field. Specifically, the CSI request field for the message 3 grant in the third embodiment may be fixed to Y bits, or may be fixed to 0 bits.

The UE may determine CSI configuration (CSI report) triggered by the message 3 grant, based on correspondence between the message 3 grant and CSI configuration used for a report. The correspondence may be determined by a specification, or may be configured by using higher layer signaling (for example, RRC signaling).

For example, when the CSI request field for the message 3 grant is 0 or Y bits, the UE may trigger one CSI report that is configured in association with the message 3 grant (or BFR).

When the CSI request field for the message 3 grant is Y bits, the UE may trigger one CSI report indicated by the CSI request field, out of $2^X$ CSI reports that are configured in association with the message 3 grant (or BFR).

The PUSCH of message 3 may include a C-RNTI corresponding to the UE. The PUSCH of message 3 may include a CSI report indicated by the message 3 grant.

The PUSCH of message 3 may be retransmitted based on a UL grant included in a PDCCH with CRC bits masked (scrambled) with a TC-RNTI (Temporary C-RNTI). The UL grant may be DCI (for example, DCI format 0_0) transmitted in the C-SS.

After transmitting the PUSCH of message 3, the UE may monitor a PDCCH with CRC bits masked (scrambled) with a C-RNTI (Step S304). The PDCCH may include DCI (for example, DCI format 1_0 and/or 1_1) transmitted in the C-SS and/or the UE-SS.

Note that DCI format 1_1 may be interpreted by terms such as non-fallback DCI and non-fallback DL assignment. DCI format 1_0 may be interpreted by terms such as fallback DCI and fallback DL assignment.

When the UE successfully receives (decodes) the PDCCH with CRC bits masked (scrambled) with a C-RNTI after transmitting the PUSCH of message 3, the UE may determine that BFR has successfully completed. When the UE successfully receives the PDCCH within the above certain period, the UE may determine (or consider) that BFR has successfully completed; if not, the UE may determine that BFR has failed.

According to the third embodiment, CB-BFR can be appropriately performed by using a search space for BFR.

(Radio Communication System)

Hereinafter, a structure of a radio communication system according to an embodiment of the present disclosure will be described. In this radio communication system, communication is carried out by using at least one or combinations of the radio communication methods illustrated in the above embodiment.

Figure 4:
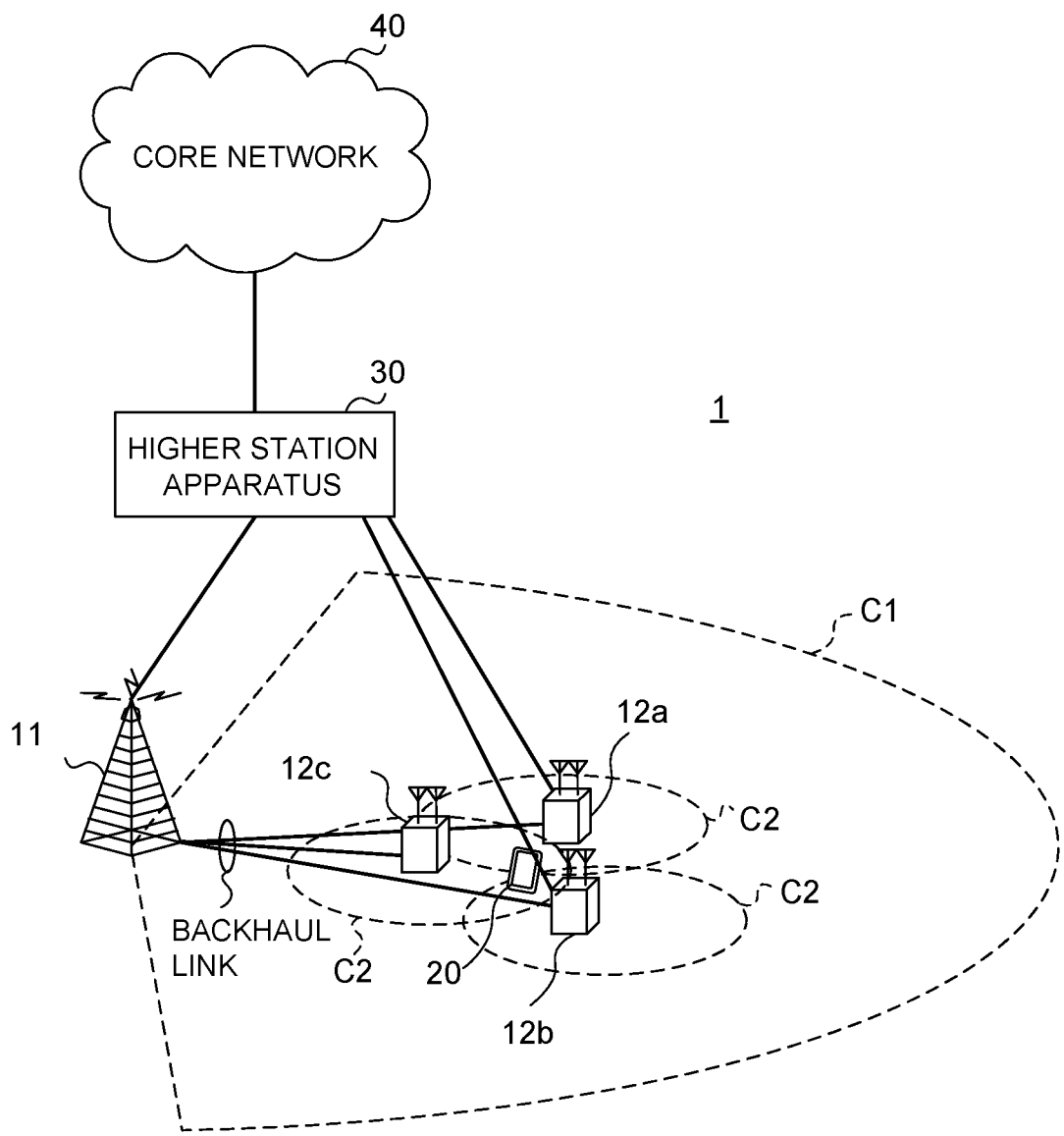
FIG. 4 is a diagram to show an example of a schematic structure of a radio communication system according to one embodiment.

FIG. 4 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channel (a PDCCH (Physical Downlink Control Channel) and/or an EPDCCH (Enhanced Physical Downlink Control Channel)), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 5:
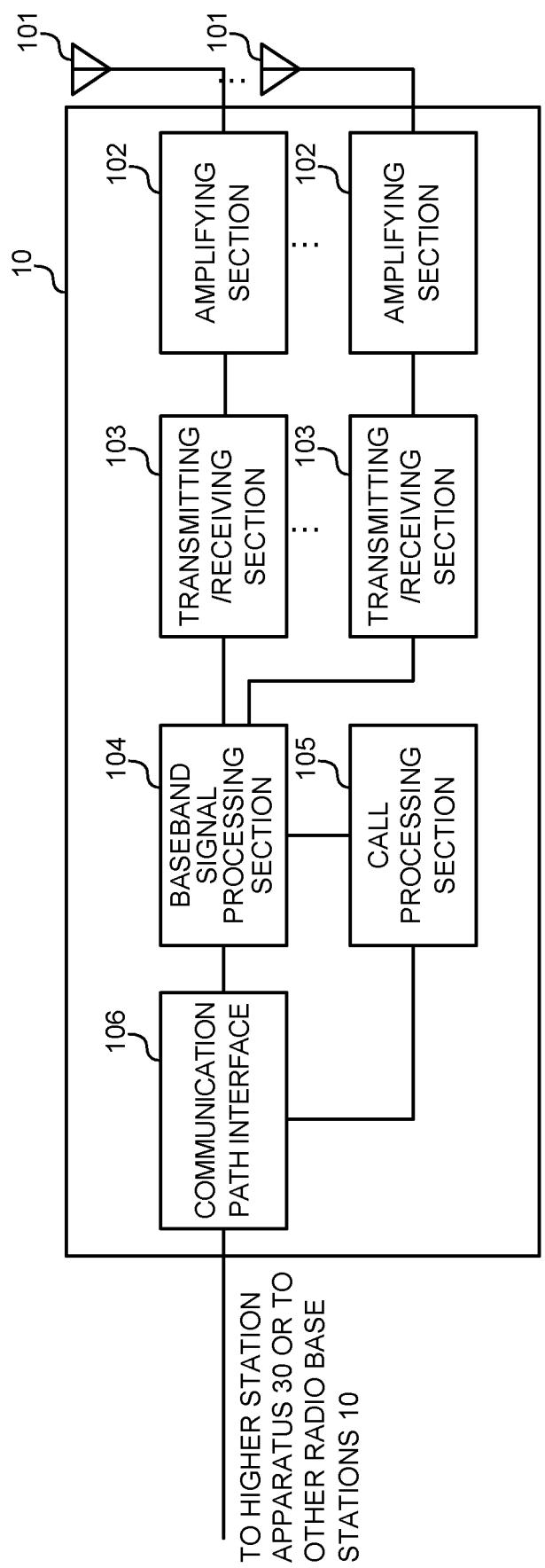
FIG. 5 is a diagram to show an example of an overall structure of a radio base station according to one embodiment.

FIG. 5 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving sections 103 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present disclosure pertains. The transmitting/receiving antennas 101 can be constituted with array antennas, for example. The transmitting/receiving sections 103 are configured to be capable of employing single BF and multi-BF.

The transmitting/receiving sections 103 may transmit signals by using transmit beams, and may receive signals by using receive beams. The transmitting/receiving sections 103 may transmit and/or receive signals by using certain beams that are determined by the control section 301.

The transmitting/receiving sections 103 may receive a variety of information described in each of the above embodiments from the user terminals 20, and/or transmit a variety of information described in each of the above embodiments to the user terminals 20.

Figure 6:
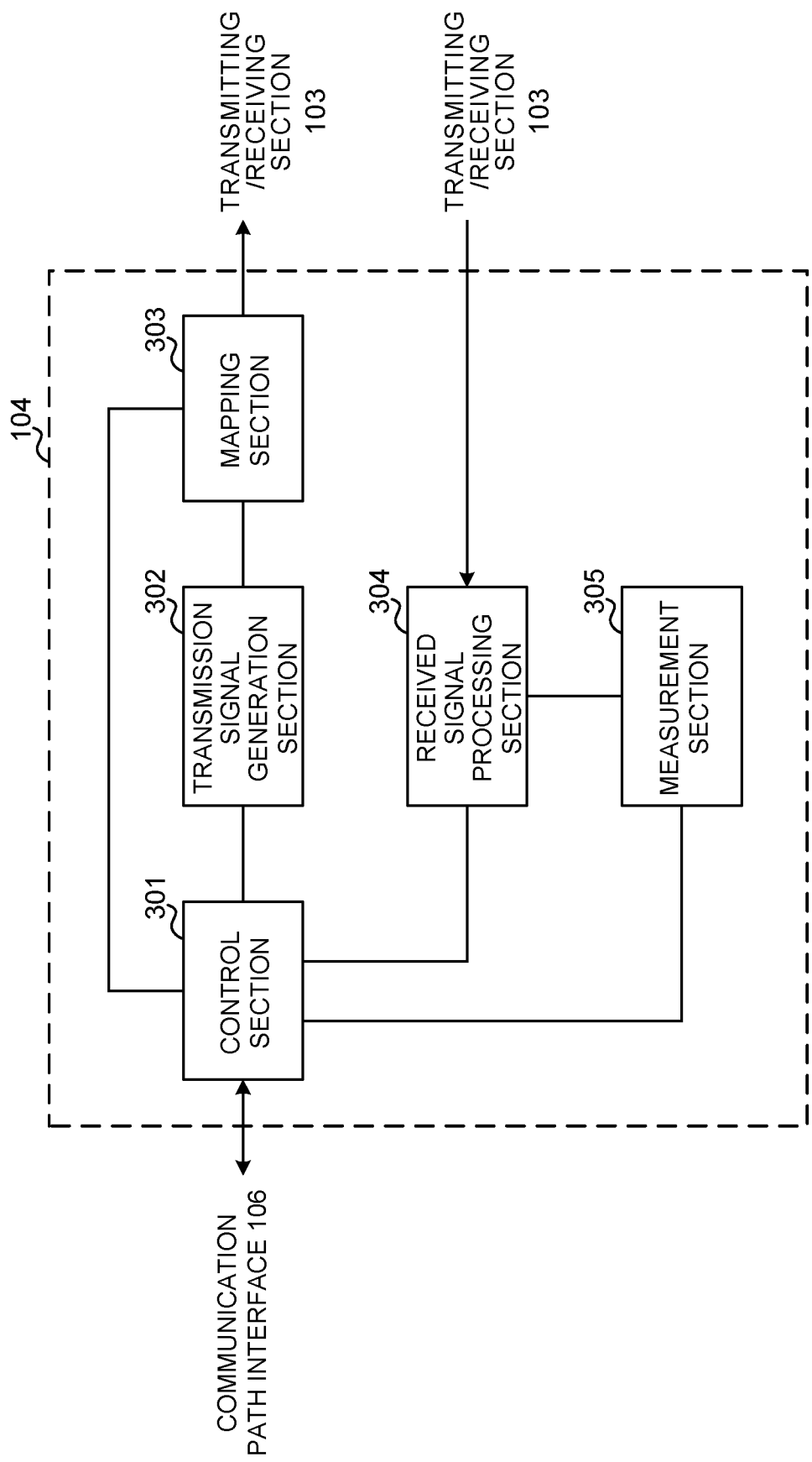
FIG. 6 is a diagram to show an example of a functional structure of the radio base station according to one embodiment.

FIG. 6 is a diagram to show an example of a functional structure of the radio base station according to one embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on.

The control section 301 performs control of scheduling of a synchronization signal (for example, a PSS/SSS), a downlink reference signal (for example, a CRS, a CSI-RS, a DMRS), and so on.

The control section 301 may perform control of forming transmit beams and/or receive beams, by using digital BF (for example, precoding) performed by the baseband signal processing section 104 and/or analog BF (for example, phase rotation) performed by the transmitting/receiving sections 103.

The control section 301 may control configuration of RLF and/or BR, based on configuration information related to radio link failure (RLF) and/or beam recovery (BR).

The control section 301 may control radio link monitoring (RLM) and/or beam recovery (BR) for the user terminals 20. The control section 301 may perform control of transmitting a response signal to the user terminals 20 in response to a beam recovery request.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, or the like is performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 7:
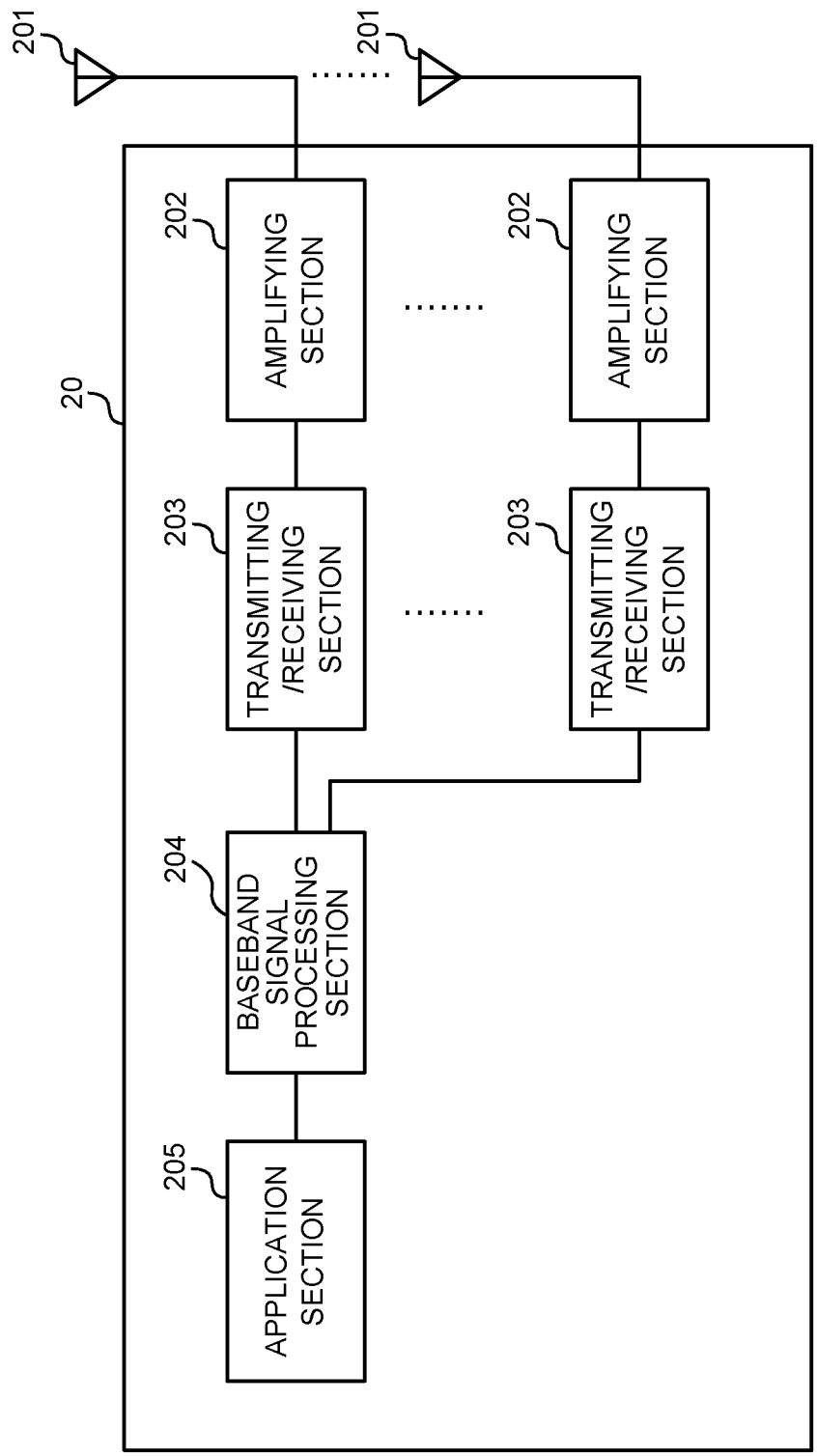
FIG. 7 is a diagram to show an example of an overall structure of a user terminal according to one embodiment.

FIG. 7 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present disclosure pertains. The transmitting/receiving antennas 201 can be constituted with array antennas, for example. The transmitting/receiving sections 203 are configured to be capable of employing single BF and multi-BF.

The transmitting/receiving sections 203 may transmit signals by using transmit beams, and may receive signals by using receive beams. The transmitting/receiving sections 203 may transmit and/or receive signals by using certain beams that are determined by the control section 401.

The transmitting/receiving sections 203 may receive a variety of information described in each of the above embodiments from the radio base stations 10, and/or transmit a variety of information described in each of the above embodiments to the radio base stations 10. For example, the transmitting/receiving sections 203 may transmit a beam recovery request to the radio base stations 10.

Figure 8:
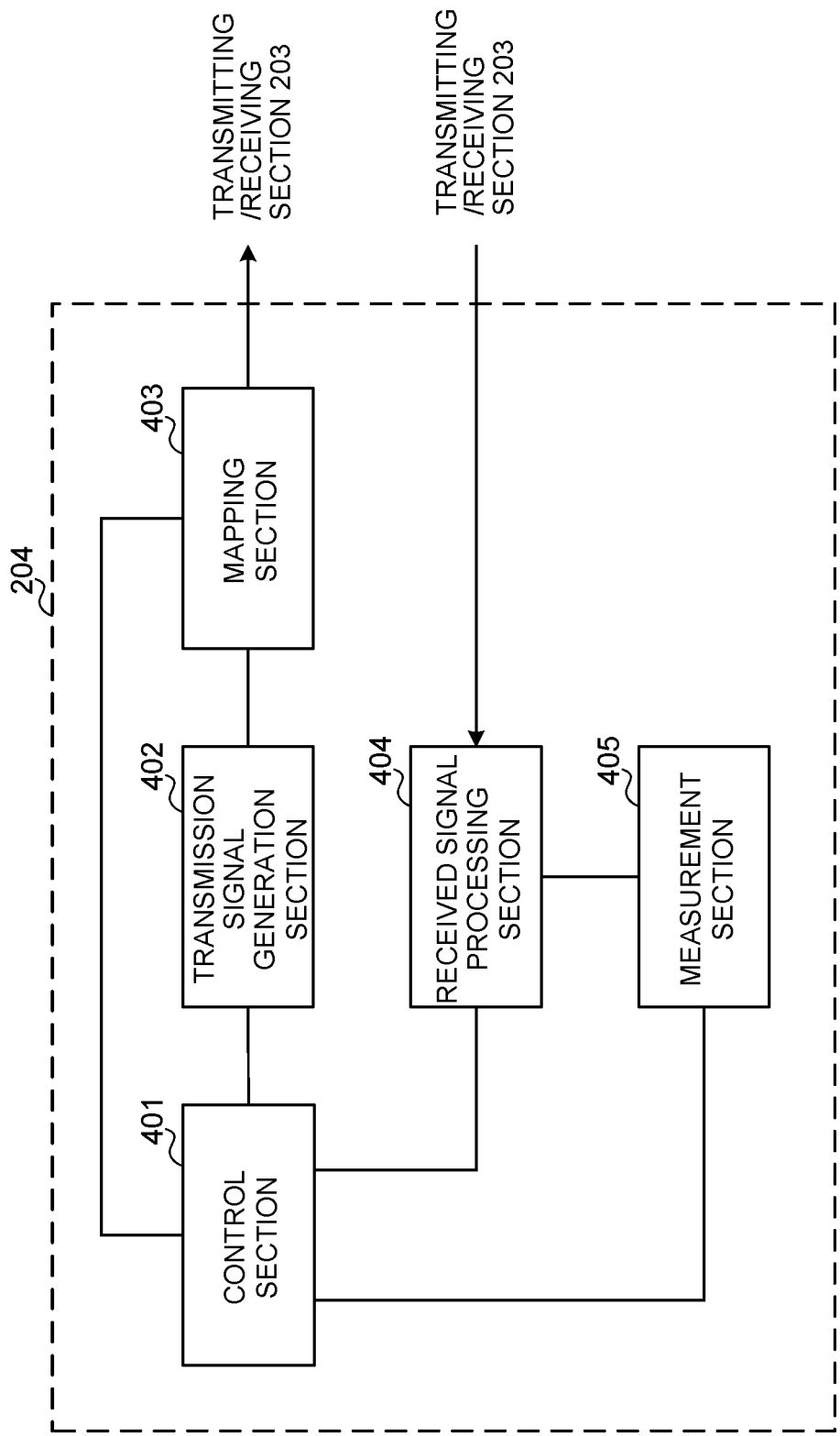
FIG. 8 is a diagram to show an example of a functional structure of the user terminal according to one embodiment.

FIG. 8 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control of forming transmit beams and/or receive beams, by using digital BF (for example, precoding) performed by the baseband signal processing section 204 and/or analog BF (for example, phase rotation) performed by the transmitting/receiving sections 203.

The control section 401 may control radio link monitoring (RLM) and/or beam recovery (BR), based on the measurement results of the measurement section 405.

The control section 401 may include a MAC layer processing section and a PHY layer processing section. Note that the MAC layer processing section and/or the PHY layer processing section may be implemented by any one or combinations of the control section 401, the transmission signal generation section 402, the mapping section 403, the received signal processing section 404, and the measurement section 405.

The MAC layer processing section performs processing of the MAC layer, and the PHY layer processing section performs processing of the PHY layer. For example, downlink user data, broadcast information, and so on input from the PHY layer processing section may be processed by the MAC layer processing section, and then be output to the higher layer processing section that performs processing of the RLC layer, the PDCP layer, and so on.

The PHY layer processing section may detect a beam failure. The PHY layer processing section may notify the MAC layer processing section of information related to a detected beam failure.

The MAC layer processing section may trigger transmission of a beam recovery request of the PHY layer processing section. For example, the MAC layer processing section may trigger transmission of a beam recovery request, based on information related to a beam failure notified from the PHY layer processing section.

The control section 401 may identify (judge) correspondence between a format of downlink control information (DCI) transmitted on a downlink control channel (PDCCH) and a search space in which monitoring of the PDCCH is performed. The search space may be configured for the user terminal 20, as a search space for a BFR procedure (search space for BFR) associated with a control resource set for a BFR procedure (CORESET for BFR) being a target of the monitoring.

When the control section 401 successfully decodes the downlink control information (DCI) with cyclic redundancy check (CRC) bits scrambled with an identifier (for example, a C-RNTI) corresponding to the user terminal 20 in a BFR procedure, the control section 401 may consider that the BFR procedure has succeeded.

When the control section 401 successfully decodes the downlink control information (DCI) with cyclic redundancy check (CRC) bits scrambled with an identifier (for example, a C-RNTI) corresponding to the user terminal 20 after transmitting message 3 in a BFR procedure, the control section 401 may consider that the BFR procedure has succeeded.

Note that message 3 may be a signal transmitted by using a PUSCH, based on a UL grant (message 3 grant) included in a PDSCH of message 2 (MAC CEs for a RA response) in CB-BFR. Message 3 may be a signal retransmitted by using a PUSCH, based on a UL grant with CRC-scrambled with a TC-RNTI (Temporary C-RNTI) in CB-BFR.

When the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically coupled, or may be realized by directly and/or indirectly connecting two or more physically and/or logically separate pieces of apparatus (for example, via wire and/or wireless) and using these plurality of pieces of apparatus.

Figure 9:
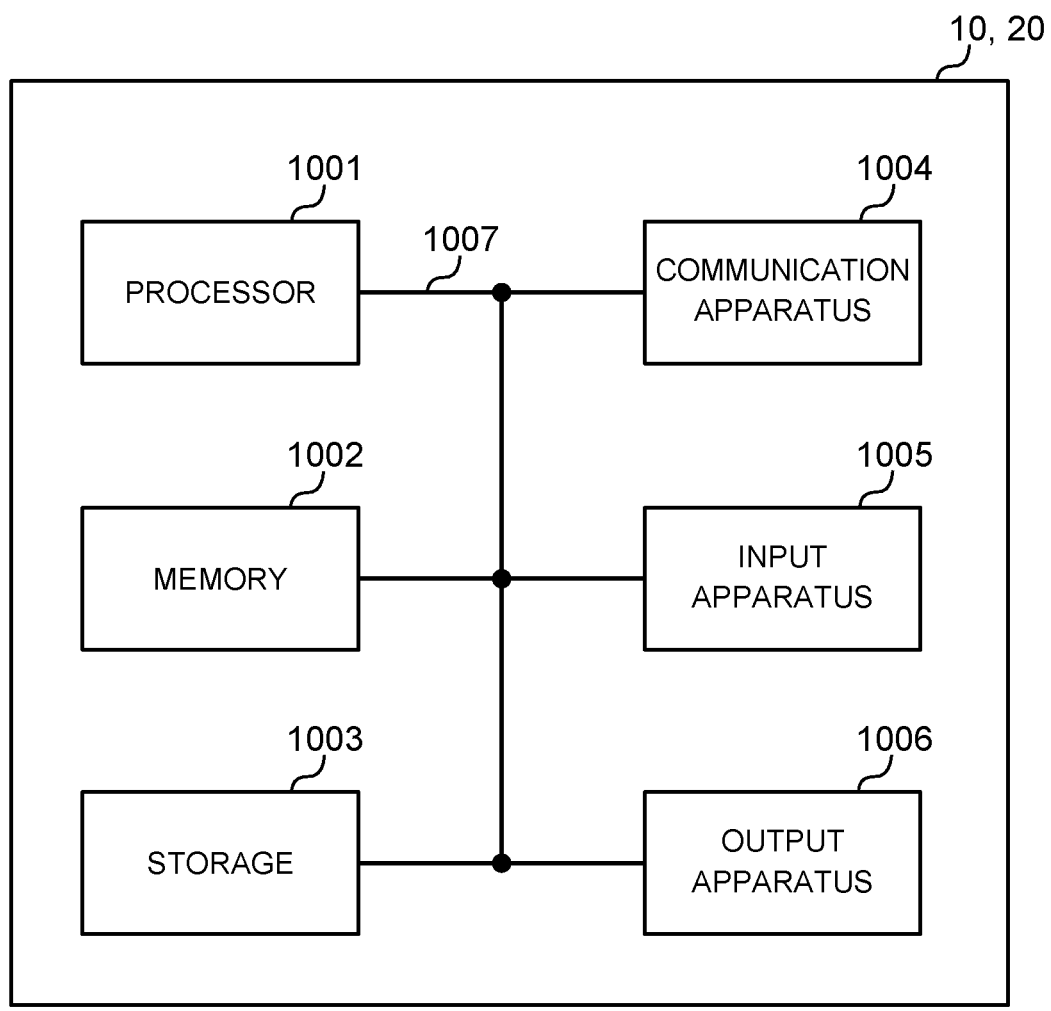
FIG. 9 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 9 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In this specification, the terms such as a "base station (BS)," a "radio base station," an "eNB," a "gNB," a "cell," a "sector," a "cell group," a "carrier," and a "component carrier" can be used interchangeably. The base station may be referred to as the terms such as a "fixed station," a "NodeB," an "eNodeB (eNB)," an "access point," a "transmission point," a "reception point," a "femto cell," a "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In this specification, the terms "mobile station (MS)," "user terminal," "user equipment (UE)," and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base station in this specification may be interpreted as a user terminal. For example, each aspect/embodiment of the present disclosure may be applied to the structure that replaces a communication between a radio base station and a user terminal with a communication between a plurality of user terminals ("D2D (Device-to-Device)"). In this case, the user terminals 20 may have the functions of the radio base stations 10 described above. The words "uplink" and "downlink" may be interpreted as "side". For example, an uplink channel may be interpreted as a side channel.

Likewise, the user terminal in this specification may be interpreted as a radio base station. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments in this specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in this specification does not generally limit the quantity or order of these elements. These designations may be used in this specification only for convenience, as a method for distinguishing between two or more elements. Thus, reference to the first and second elements does not imply that only two elements may be employed, or that the first element must precede the second element in some way.

The term "judging (determining)" as in this specification may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used in this specification mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of those are used in this specification or in claims, these terms are intended to be inclusive, in a manner similar to the way the term "including, comprising, or being provided" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description of this specification is provided only for the purpose of explaining examples, and should by no means be construed to limit the invention according to the present disclosure in any way.

What is claimed is:

1. A terminal comprising:
    a processor that:
        when a UE-specific search space for a beam failure recovery (BFR) procedure associated with a control resource set (CORESET) for the BFR procedure is configured by a radio resource control (RRC) information element, performs to monitor downlink control channel during the BFR procedure in the UE-specific search space for the BFR procedure configured by the RRC information element, and
        when the UE-specific search space is not configured by the RRC information element, performs to monitor the downlink control channel during the BFR procedure in a UE-common search space; and
    a receiver that monitors the downlink control channel during the BFR procedure.

2. A radio communication method for a terminal comprising:
    determining whether a UE-specific search space for a beam failure recovery (BFR) procedure associated with a control resource set (CORESET) for the BFR procedure was configured by a radio resource control (RRC) information element or the UE-specific search space was not configured by the RRC information element has occurred;
    in response to determining the UE-specific search space for the BFR procedure associated with the CORESET for the BFR procedure is configured by the RRC information element, performing to monitor downlink control channel during the BFR procedure in the UE-specific search space for the BFR procedure configured by the RRC information element;
    in response to determining the UE-specific search space is not configured by the RRC information element, performing to monitor the downlink control channel during the BFR procedure in a UE-common search space; and
    monitoring the downlink control channel during the BFR procedure.

3. A base station comprising:
    a processor that:
        when a UE-specific search space for a beam failure recovery (BFR) procedure associated with a control resource set (CORESET) for the BFR procedure is configured to a terminal by a radio resource control (RRC) information element, performs to transmit downlink control channel during the BFR procedure in the UE-specific search space for the BFR procedure configured by the RRC information element, and
        when the UE-specific search space is not configured to the terminal by the RRC information element, performs to transmits the downlink control channel during the BFR procedure in a UE-common search space; and
    a transmitter that transmits downlink control information via the downlink control channel during the BFR procedure of the terminal.

4. A system comprising a terminal and a base station, wherein
    the terminal comprises:
        a processor that:
            when a UE-specific search space for a beam failure recovery (BFR) procedure associated with a control resource set (CORESET) for the BFR procedure is configured by a radio resource control (RRC) information element, performs to monitor downlink control channel during the BFR procedure in the UE-specific search space for the BFR procedure configured by the RRC information element, and when the UE-specific search space is not configured by the RRC information element, performs to monitor the downlink control channel during the BFR procedure in a UE-common search space; and a receiver that monitors the downlink control channel during the BFR procedure; and the base station comprises:

a transmitter that transmits downlink control information via the downlink control channel during the BFR procedure.

* * * * *